United States Patent [19]

Anderson

[11] 4,036,076

[45] July 19, 1977

[54] GEAR ADJUSTING, LOCKING, AND PRE-LOADING MEANS

[75] Inventor: John C. Anderson, Brookfield, Ill.

[73] Assignee: International Harvester Company, Chicago, Ill.

[21] Appl. No.: 661,239

[22] Filed: Feb. 25, 1976

[51] Int. Cl.² .......................... F16H 55/18; F16H 1/14
[52] U.S. Cl. ........................................ 74/409; 74/417
[58] Field of Search ................................. 74/409, 417

[56] References Cited

U.S. PATENT DOCUMENTS

| | | | |
|---|---|---|---|
| 3,485,109 | 12/1969 | Dunlap | 74/409 |
| 3,600,965 | 8/1971 | Folkerts | 74/409 |

Primary Examiner—Leonard H. Gerin
Attorney, Agent, or Firm—John W. Gaines; Floyd B. Harman

[57] ABSTRACT

Adjusting, locking, and pre-loading means for a bevel gear or the like exerting axial thrust on the shaft which the gear is made fast to. The adjusting means is a large nut which is rotatable in its mating threads to move a mount for the gear shaft so as to locate the position of the gear's plane of rotation. The locking means is that portion of a locking and pre-loading bolt which bolts the nut to the non-rotatable mount to set the located position of the plane of rotation. The pre-loading means is that portion of the same bolt which exerts an opposite force on the nut and on its mating threads, stressing the two in opposite ways so as to pre-load the threads in the same direction in which the gear thrust is exerted, enabling the axial thrust of the gear to be additive to the pre-load rather than tending to unload the pre-load, thus permanently fixing the set location of the plane of rotation of the gear with no free play.

10 Claims, 6 Drawing Figures

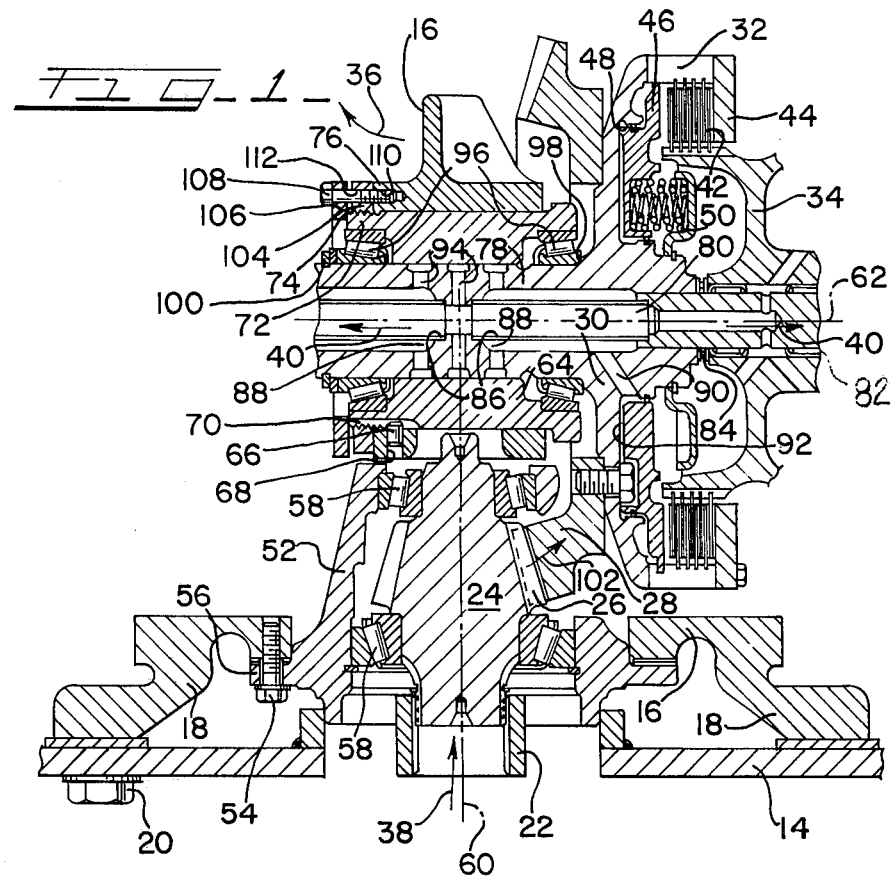

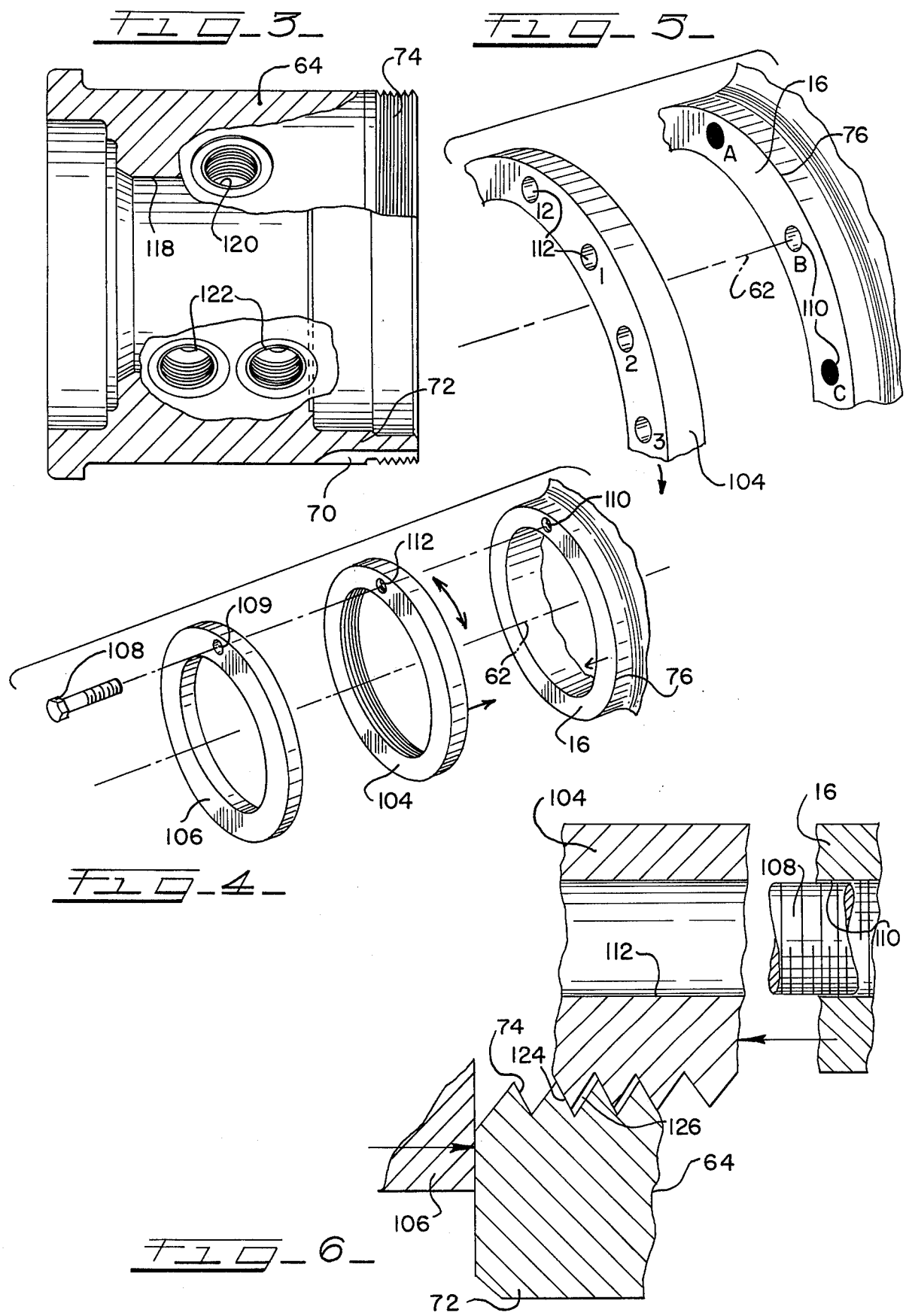

GEAR ADJUSTING, LOCKING, AND PRE-LOADING MEANS

This invention relates to fixing the backlash setting of a mounted gear which produces axial thrust in a shaft the gear is made fast to. It more particularly relates to adjusting, locking, and pre-loading means for the mounting of the gear, to nullify the axial effect of gear thrust on the mounting.

The tooth meshing forces in gearing transmitting drive at an angle, such as any of the angles commonly accomplishable in drives, causes a separating action on the teeth which changes to higher values as the torque being transmitted changes to the higher values. That separating action has an axial thrust component that can manifest itself by moving the gear-lash adjuster, and I have perceived such movement occurring, for example, in the gear adjustment nut of a nut-type gear-lash adjuster. I have discovered the nut perceptibly moves axially in its threads as drive torque changes, thus enabling unwanted gear lash changes to occur and the predetermined pitch line relationship to be altered under the differing loads.

So it develops that an accepted way of gear adjustment with which I am familiar, utilizing a non-rotatable mount which is bolted to a gear adjusting nut to prevent rotation of the latter in its threads, is in reality susceptible to the effects of axial thrust. The reason is the imperfectness of threading which, as a practical matter, creates a less-than-interference-fit between the nut and its set of mating threads and, instead, lets the thread mesh vary all the way down to a very loose fit in the threads in some instances in the prior art. The drawback is that the gear affected, changes its plane of rotation in the axial direction and the gear lash, as set, has no stable adjustment.

My invention providing for positive location, setting, and fixing of the gear plane affords the advantage of materially reducing the foregoin objections and drawbacks if not substantially eliminating them, as will now be explained in detail. What a main objective hereof amounts to is that, whereas the rising axial gear thrust is allowed to take up slack in the nut threads of prior art gear adjusters, my backlash-setting fixing means, in comparison, takes all slack out of the adjuster nut threads beforehand so that axial gear thrust meets solid, preloaded resistance at all values of thrust, and there can be no movement because there is no room for yielding. Features, objects and advantages will either be specifically pointed out or become apparent when, for a better understanding of the invention, reference is made to the following description, taken in conjunction with the accompanying drawings which show a preferred embodiment thereof and in which:

FIG. 1 is a cross sectional, essentially plan view of a tractor steering drive mechanism embodying the present gear adjuster invention, the section being taken along the lines I—I of Fig. 2;

FIG. 2 is a side elevational view of the mechanism of Fig. 1;

FIG. 3 is a longitudinal sectional view of one of the five parts of the gear adjuster assembly;

FIG. 4 is a schematic isometric view, exploded, of the other four parts of the adjuster assembly;

FIG. 5 is an exploded, isometric first-quarter partial-showing of two of the parts of Fig. 4, in greater detail; and FIG. 6 is an enlarged, greatly exaggerated sectional view which is similar to Fig. 1 but which includes only a detail appearing in the latter in the upper left hand corner thereof.

More particularly in Fig. 1, the front wall 14 of the steering compartment in the rear main frame of a crawler tractor is shown supporting a main steering housing 16 by means of pairs of brackets 18 on the housing 16 and individual bolts connected thereto through the wall 14, such as the bolt 20 as shown.

Drive from a tractor transmission, not shown, through a splined sleeve 22 and an input pinion 24 splined thereto transfers through meshing beveled gear teeth 26 to a bevel gear 28 and a bevel gear hub 30 to which the bevel gear is bolted. In the side of the main steering housing 16 to the right as viewed in Fig. 1, it is through a clutch outer casing 32 integral with the bevel gear hub 30 that drive torque is applied, and through a brake cylinder, not shown, that brake torque is applied, to a common output member 34 for controlling, at that side of the tractor, the traction mechanism thereat. A curved arrow 36 generally indicates the area occupied by a similar clutch-brake mechanism, not shown, and not herein described, for the side of the housing 16 as viewed to the left in FIG. 1.

The drive path is indicated by an arrow 38 for the drive in and indicated by the oppositely directed arrows 40 for the drive out, thus effecting a so-called right angle drive.

A hydraulically controlled clutch includes a stack 42 of splined clutch plates, a backing plate 44 at one side thereof and secured to the clutch outer casing 32, and a clutch piston 46 at the other side. The piston 46 is controlled by a clutch cylinder 48 for engagement of, and by sets of clutch release springs 50 for the disengagement of, the plate stack 42 for coupling and uncoupling the bevel gear 28 to the common output member 34.

A tapered pinion carrier housing 52 is secured by bolts 54 and a housing flange 56 to a circular attachment flange of the main steering housing 16, and journals the shaft ends of the input pinion 24 in the bearing span of a tapered roller assembly 58.

Disposed on an axis 60 normal to the main housing axis 62, the input pinion 24 is secured in place by the bearing assembly 58 so that the pinion axis 60 is fixed, and so that the pinion 24 itself and the plane, or literally the cone, of rotation of the pinion teeth are affixed against axial movement irrespective of the amount of axial gear thrust.

Concentrically arranged about the main axis 62, a bearing housing 64 and the supporting central portion of the main housing 16 constitute a pair of respective inner and outer members cooperating, by reason of a pin 66 pressed into a main housing opening 68 to a position protruding into a slotted keyway 70 in the bearing housing 64, so as to be relatively non-rotatable but axially slideable. The bearing housing 64 has an end section 72 formed with a set of external nut threads 74 and projecting beyond the corresponding foreshortened end section 76 of the supporting portion of the housing 16.

A hub shaft 78 for the bevel gear hub 30, which relies vitally upon the bearing housing 64 for its hydraulic and mechanical functions, has a central lubricating oil passage 80 through which, in oppositely outward directions, lubricating oil is supplied to the bearing span of a needle assembly 82 by which the common output member 34 at each end of the hub shaft 78 is journalled to that end of the shaft. A bearing 84 is illustrative of the several thrust bearings as usually found between the hub shaft 78 and each common member 34 to prevent relative axial movement.

Inside of the hub shaft 78 but outside of a pair of sleeves 86 defining the lube oil passage 80, left and right clutch control passages 88 extend axially outwardly, one of which is connected at 90 to the clutch chamber 92 of the clutch cylinder 48.

The left and right clutch control passages 88 and the lube oil passage 80 in the shaft 78 have radial inlets 94 therein by which they are supplied with oil under proper pressure from outer supply passages, not shown, formed radially in the bearing housing 64.

A bearing span in the bearing housing 64 comprises a tapered roller bearing assembly 96 journalling the gear hub shaft 78 therein so as to provide antifrictional rotational support to the latter, but at the same time presents an opposed, spaced apart hub shoulder 98 and a circle clip 100 in the shaft 78 holding the latter axially fast against relative movement with respect to the assembly 96 and bearing housing 64.

Because of the major component of the tooth separation vector 102 acting in the axial direction 62, with the resulting tendency to disturb the precise backlash setting of the teeth which happen to be spiral teeth in the embodiment illustrated, the bevel gear 28 is precisely adjusted, locked, and preloaded by means of a large, ring-like nut 104 on the external nut threads 74 and also by means of associated components. One such component is a locking plate or ring 106 forming a thrust washer spaced apart from the nut 104, and the other components comprise a number of, for example four, tensioned bolt elements 108 passing in order through that number of bolt openings 109 (Fig. 4) in the locking plate 106, through the nut 104, and into anchored positions in selected ones of a ring of drilled and tapped bolt holes 110 in the central portion of the main steering housing 16. In the nut 104 itself, selected ones in a ring of locking holes 112 receive the four bolts 108 so as to lock the nut 104 against rotation and thereby prevent axial movement of any part of the assembly after being adjusted, locked, and pre-loaded.

It will be apparent from an examination of Fig. 1 how the tensioned bolts 108 bring about the drawing of the locking plate 106 and bearing housing 64 into solid abutment. The end section 72 of the latter has a lengthwise projection or outward overhang sufficient to maintain an appreciable clearance gap between the confronting threadheld nut 104 and housing-abutting plate 106.

MAIN STEERING HOUSING 16— FIG. 2

The main housing as shown in this figure of drawing bears the reference numeral 16, and the other reference numerals are applied corresponding to the foregoing. An end cover 114 secured to the housing by cover bolts 116 closes off the right end of the housing which drives the corresponding right final drive and right tractor track chain, not shown. In the hole ring at the end of the foreshortened end section 76 of the main housing 16, the axially extending anchoring holes 10 are spaced apart at an equal angular interval of 45° on center, making eight such holes 110 as illustrated. Thus the four bolts 108 when equally spaced apart at a 90° angular interval can, in one position, occupy alternating holes as one set, and in another position can occupy each remaining hole 110 as another set of holes.

BEARING HOUSING 64— FIGS. 2 AND 3

The bearing housing 64 as shown in this figure has an interface 118 with the hub shaft 78 when fitted therein and is sealed fluid tight at points along the shaft 78 by 0-rings, not shown, fitted in annular grooves on the latter. At the midsection of the housing 64, a single, tapped fitting-receiving, lube oil passage 120 extends radially inwardly to the interface 118 in the bore for cooperation with the shaft 78, and a pair of tapped, fitting-receiving, left and right clutch oil passages 122 extend radially inwardly to the interface 118 for further flow of the oil radially and axially through the shaft 78.

LOCKING— FIG. 4

This figure does not show the assembly of the inner and outer housings 64 and 16 and hub shaft 78, which can be presumed assembled with the housing 64 within the housing 16 and with the gear hub shaft 78 within the inner housing 64. In practice, the bevel gear teeth 26, not shown, are brought during assembly into firm mesh, whereupon the nut 104 in Fig. 4 is introduced on its threads and screwed by a spanner wrench in the direction of the single arrows until it makes contact with the foreshortened end section 76 of the main steering housing 16 in Fig. 4. One suitable thread for the nut 104 and its mating threads is the 7¼ inches — 16 UNS thread used in one physically constructed embodiment of the invention.

Next, the four bolts are introduced, as illustrated by the bolt 108 which passes through the registering series consisting of an opening 109 in the ring of openings in the plate 106, a bolt hole 112 in the ring of holes 112 in the nut 104, and into an anchoring hole 110 in the ring of holes of housing 16. Then when the four bolts 108 are rotated so as to be threadably tightened in their final position, the nut 104 is locked against movement in either of the directions of the double headed arrow; hence, the fixed main housing 16 fixes the rotational and axial position of the bearing housing assembly, not shown, and fixes the axial position of the spiral bevel gear, not shown.

ADJUSTMENT— FIG. 5

In contrast to the ring of eight anchoring holes 110 in the foreshortened end section 76 of the main steering housing 16, the nut 104 has a ring of 12 bolts holes 112 which are equally spaced apart at an equal angular interval of 30° center. It will be noted the arithmetic is such that the larger angular interval of 45° of holes 110 is no exact multiple of the intermediate angular interval 30° of the holes 112. The latter numerally bear the individual hole differentiation of 12, 1, 2, and 3, applied thereto in this figure, whereas the holes 110 have the individual differentiation notation A, B, and C applied thereto for reference.

Let it be assumed as illustrated at the start that the holes 12 and A are in registry and that the holes 3 and C are in registry and hold therein a pair of bolts, not shown, received at the darkened two anchor points. Backlash in the gearing is assumed to be excessive due to gear tooth wear in service, or an insufficiently tight adjustment during initial installation. Removing the excessive portion of backlash requires removing the bolts, not shown, and rotating the nut 104 as shown in Fig. 5 in the clockwise direction of the arrow in its noted 7¼ inches — 16 UNS threads 74, not shown. Initial rotation will advance hole 1, from its so-called 1 o'clock position, by the number of degrees equal to the difference between the large interval 45° and the intermediate interval 30°, namely, a 15° rotation, whereupon that hole 1 in the nut 104 will register with hole B in the housing 16. Continued clockwise rotation for another 15° in the direction of the arrow will advance the hole 2 into a so-called 3o'clock position where it will register with hole C of housing 16. The rotation operation is continued. In the physically constructed embodiment of the invention, the foregoing 15° increments each resulted in nut axial movement of 0.003 inches (0.076 mm.). It will therefore be appreciated that fine backlash adjustments are thus attainable and when the desired location is reached, the bolts are reinserted for setting and fixing the location under pre-load as will now be explained.

PRE-LOADING — FIG. 6

After the nut 104 is brought into contact with the main housing 16 as described, and the insertion and screwing down of the bolts 108 is started, the increasing tension in the bolts 108 in conjunction with the thrust washer effect of the locking plate 106 produce engagement under stress of both housing members 64 and 16 with opposite force, as indicated by the single arrows, tending to create axial slide motion. The non-rotatable nut 104, however, shifts a barely perceptible amount in its threads 74 on the housing projecting end section 72, preloading each nut thread on the leading side 124 and opening up an exaggeratedly-shown axial gap 126 on the trailing side of each nut thread. In actual practice in the noted 7¼ — 16 UNS thread for the nut 104 and threads 74, that introduced gap 126 representing shift of the bearing housing 64 to the right as viewed in Fig. 6, amounted to an axial movement of 0.005 inches (0.127 mm.) which was just sufficient to introduce the desired amount of working backlash between the bevel gear teeth, 26, not shown.

Of course, if the set backlash measures out to be too loose or too tight, it can be precisely readjusted in the manner described in connection with Fig. 5 preceding. Backlash, once set, cannot change on the main housing axis 62 because the gear 28 thereon is fixed against movement from that axis and along that axis, and cannot change on the normal housing axis 60 because the pinion 24 thereon is fixed against movement from that axis and along that axis.

Because the direction of bevel tooth separation is in the same rightward direction as the thread 74 pre-load as viewed in FIG. 6, gear reaction under increased torque does not work in a direction to unload the preload but rather acts additively therewith and hence without possibility of shift of the plane of rotation of the bevel gear 28, not shown.

In connection with the bolts 108 passing through the locking plate 106, it will be appreciated that, although the bolts 108 themselves lock the nut 104 against rotation, it is the plate 106, as a vital adjunct to the bolts, which forces the nut 104 into solid abutment with the central portion of the main housing 16 and forces the axial preloading by the nut of the projecting end threads 74 so as to transmit between housings 64 and 16 the axial thrust from the gear with no free play. In the preceding example of the desirable working amount of inherently introduced backlash, a force balance of means is established by and between a first means (106, 108) which, with its direction in the way of the introduced backlash shift, will tend to create axial slide motion, and a second means (74, 124) which takes up the shift right in its threads, to prevent the slide motion by taking on preload.

It will be further appreciated, when using the ends of the supported bearing housing 64 as a reference, that the plane of rotation of the spiral bevel gear 28 is fixed adjacent a housing end aforesaid which is opposite from the housing's unobstructed projecting end section 72, whereby the gear adjuster nut 104 and the pre-loader fastener bolts 108 are unobstructed by the gear 28 so as to be accessible to the assembler for locating, setting the location, and fixing the location of the gear under preload. So seemingly in indirect manner, the assembler works from a remote end section of the bearing housing 64 where he can freely turn the large nut 104, and can freely turn the bolts 108 to pre-determined torque, so that the gear position at a proximal end is what is really being affected and without interference due in any way to the presence of the gear 28.

Variations within the spirit and scope of the invention described are equally comprehended by the foregoing description.

What is claimed is:

1. A relatively axially slideable pair of relatively non-rotatable members disposed one within another having:
   first locking means comprising a thrust washer and engaging both members with opposite force tending to create axial slide motion; and
   second adjusting means comprising a nut engaging both members and pre-loaded to prevent slide motion.

2. The invention of claim 1, characterized by:
   said members having an end section of a first one of the members relatively foreshortened in comparison to the corresponding protruding end section of the second;
   the thrust washer of said first means being included in a connection formed between said foreshortened and protruding end sections of the members; and
   the nut of said second means forming a direct connection between said foreshortened and protruding end sections of the members.

3. The invention of claim 2, the first and second means characterized by, respectively:
   said thrust washer comprising a locking plate having direct abutment against the protruding one of the end sections and having first devices connecting it to the other one;
   said nut comprising an adjusting nut having direct abutment against the foreshortened one of the end sections and including second devices connecting it to the other one.

4. The invention of claim 3, characterized by:
   said second comprising nut threads establishing meshing engagement with the protruding section and connecting the adjusting nut to the inner member;
   said first devices comprising threaded fasteners between the foreshortened section and the locking plate and connecting the latter to the outer member, at least one of the threaded fasteners establishing cooperation with the adjusting nut, holding the latter in adjustment locked nonrotatably on its threads.

5. A non-rotatable, relatively axially slideable pair of members disposed one within another and with an end of a first one of the members projecting beyond the corresponding end of the second, said members having a thrust washer engaging the projecting end and a nut spaced therefrom and threaded in a set of threads on said projecting end of the first and engaging the second member, and means exerting axial tension effectively interconnecting the members and the washer, and bringing about the drawing of the washer and first member into solid abutment, the drawing of the nut and the second member into non-rotatable abutment, and the axial pre-loading of the nut in its threads on said projecting end.

6. Drive mechanism for the transmission of power by gear means which includes a driving shaft and which produces axial thrust in the driving shaft, comprising:

a supporting housing with a main axis;

gear means thereadjacent productive of thrust in a direction along said housing axis;

a supported housing rotatably supporting a gear portion of the gear means in a plane fixed with respect to the housing, and supported by the supporting housing so as to be non-rotatable and coaxially slideable thereto, a first one of said housings having a projecting end formed with nut threads and projecting beyond the corresponding end of the second housing;

an adjuster nut positioned in the nut threads so as to confront said corresponding end of the second housing;

a thrust washer engaging the projecting end of the first housing; and pre-loader tension means effectively interconnecting the housings and the washer in fixed relation free of play, and bringing about the drawing of the washer and first housing into solid abutment, the drawing of the nut and the second housing into non-rotatable abutment, and the axial pre-loading by the nut of the nut threads so as to transmit between housings the axial thrust from the gear means with no free play.

7. The invention of claim 6 characterized by:

a ring of fastener holes in each of the washer, nut, and second housing;

the tension means comprising a number of fasteners received in that number of holes in the washer, nut, and second housing mutually, when the latter are indexed for hole registry, the second housing hole ring and the nut hole ring having equally spaced apart holes arranged in each but with the hole angular interval in one relatively large compared to, and not an exact multiple of, an intermediate hole angular interval in the other ring, whereby said number of holes following said indexed registry will align in registry each time the second housing and nut are indexed through a small angle of relative rotation equal to the difference between the large and intermediate hole angular interval.

8. The invention of claim 6, characterized by:

said drive mechanism forming a right angle drive through said supporting housing, feeding thereinto along a housing axis normal to the housing main axis;

said gear means comprising a gear, a hub shaft to which the gear is affixed and which is antifrictionally rotatably supported in the fixed supported housing, with the gear and shaft mounted on said main axis so as to be fixed against movement from that axis, and fixed against movement along that axis, the fixed plane of said gear being fixed adjacent an end of the fixed supported housing opposite from its unobstructed projecting end whereby the adjuster nut and pre-loader tension means are unobstructed by the gear so as to be accessible for locating, setting, and pre-loading the latter;

a pinion drivingly meshed with said gear; and means antifrictionally rotatably supporting the pinion on said normal axis so as to be fixed against movement from that axis and fixed against movement along that axis.

9. The invention of claim 6, characterized by:

said drive mechanism forming a angle drive through said supporting housing, feeding thereinto along a second housing axis intersecting the housing main axis;

said gear means comprising meshing gearing comprising a gear hub shaft antifrictionally rotatably supported in the fixed supported housing, a gear supported in the housing by the hub shaft for rotation in said fixed plane on the housing main axis, and a pinion establishing gear tooth meshing cooperation with the gear and antifrictionally rotatably supported in the main housing on said second housing axis;

the direction of gear teeth separation and thread-preload being the same, whereby gear reaction under changing torque acts additively to the pre-load without tendency to unload the latter and thus unwantedly shift the gear plane.

10. The invention of claim 9 characterized: by an angle drive which is a right angle drive; and by meshing gearing which is spiral bevel gearing forming the right angle; and by main and second axes which intersect at right angles to one another.

* * * * *